US009471647B2

(12) United States Patent
Bent et al.

(10) Patent No.: US 9,471,647 B2
(45) Date of Patent: *Oct. 18, 2016

(54) NODE-LEVEL SUB-QUERIES IN DISTRIBUTED DATABASES

(71) Applicant: International Business Machines Corporation, Armonk, NY (US)

(72) Inventors: Graham A. Bent, Winchester (GB); Patrick Dantressangle, Chandlers Ford (GB); David R. Vyvyan, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/871,817

(22) Filed: Sep. 30, 2015

(65) Prior Publication Data
US 2016/0117369 A1    Apr. 28, 2016

Related U.S. Application Data

(63) Continuation of application No. 12/248,304, filed on Oct. 9, 2008.

(51) Int. Cl.
*G06F 17/30*    (2006.01)

(52) U.S. Cl.
CPC ... *G06F 17/30545* (2013.01); *G06F 17/30339* (2013.01)

(58) Field of Classification Search
CPC .................. G06F 17/30392; G06F 17/30637; G06F 17/30289; G06F 17/30646; G06F 17/30657
See application file for complete search history.

(56) References Cited

U.S. PATENT DOCUMENTS

| 5,201,046 A | 4/1993 | Goldberg et al. |
| 5,295,256 A | 3/1994 | Bapat |
| 5,408,652 A | 4/1995 | Hayashi et al. |
| 5,418,950 A | 5/1995 | Li et al. |
| 5,701,453 A | 12/1997 | Maloney et al. |
| 5,794,229 A | 8/1998 | French et al. |
| 5,873,088 A | 2/1999 | Hayashi et al. |
| 5,903,893 A | 5/1999 | Kleewein et al. |

(Continued)

OTHER PUBLICATIONS

United States Patent and Trademark Office, Office Action for U.S. Appl. No. 12/248,082, Jan. 4, 2011, pp. 1-19, Alexandria, VA, USA.

(Continued)

*Primary Examiner* — James Trujillo
*Assistant Examiner* — Fatima Mina
(74) *Attorney, Agent, or Firm* — Lee Law, PLLC; Christopher B. Lee

(57) ABSTRACT

A database query is received that includes a logical query indicator at a distributed database node within a distributed network of databases. The logical query indicator includes at least one physical database query and at least one database node identifier that allows at least one distributed database node to identify at least one physical database to execute the physical database query against. It is determined that the at least one database node identifier matches a local node identifier. The at least one physical database query is executed against at least one local physical database table. A local query response is formed including data retrieved from the at least one local physical database table. The database query is responded to with at least the local query response.

9 Claims, 4 Drawing Sheets

(56) References Cited

U.S. PATENT DOCUMENTS

| | | |
|---|---|---|
| 5,937,402 A | 8/1999 | Pandit |
| 6,016,497 A | 1/2000 | Suver |
| 6,175,837 B1 | 1/2001 | Sharma et al. |
| 6,226,788 B1 | 5/2001 | Schoening et al. |
| 6,262,976 B1 | 7/2001 | McNamara |
| 6,263,328 B1 | 7/2001 | Coden et al. |
| 6,457,007 B1 | 9/2002 | Kikuchi et al. |
| 6,694,306 B1 | 2/2004 | Nishizawa et al. |
| 6,708,186 B1 | 3/2004 | Claborn et al. |
| 6,950,823 B2 | 9/2005 | Amiri et al. |
| 7,216,133 B2 | 5/2007 | Wu et al. |
| 7,246,108 B2 | 7/2007 | Ahmed |
| 7,251,653 B2 | 7/2007 | Huang et al. |
| 7,403,956 B2 | 7/2008 | Vaschillo et al. |
| 7,596,550 B2* | 9/2009 | Mordvinov ....... G06F 17/30433 |
| 7,664,758 B1 | 2/2010 | Urano et al. |
| 7,693,900 B2 | 4/2010 | Wilmering et al. |
| 7,725,603 B1 | 5/2010 | Kanevsky et al. |
| 7,752,213 B2 | 7/2010 | Todd |
| 7,882,132 B2 | 2/2011 | Ghatare |
| 7,908,266 B2 | 3/2011 | Zeringue et al. |
| 7,921,131 B2 | 4/2011 | Uppala |
| 7,974,961 B2 | 7/2011 | Barbarek |
| 8,051,213 B2 | 11/2011 | Van Hensbergen et al. |
| 8,160,984 B2 | 4/2012 | Hunt et al. |
| 8,200,684 B2 | 6/2012 | Seitz et al. |
| 8,311,998 B2 | 11/2012 | Correll, Jr. |
| 2003/0009551 A1 | 1/2003 | Benfield et al. |
| 2003/0093647 A1 | 5/2003 | Mogi et al. |
| 2003/0120651 A1 | 6/2003 | Bernstein et al. |
| 2003/0172056 A1* | 9/2003 | Dettinger .......... G06F 17/30392 |
| 2004/0044727 A1 | 3/2004 | Abdelaziz et al. |
| 2004/0181522 A1 | 9/2004 | Jardin |
| 2005/0027701 A1 | 2/2005 | Zane et al. |
| 2005/0030952 A1 | 2/2005 | Elmasry et al. |
| 2005/0065925 A1 | 3/2005 | Weissman et al. |
| 2005/0096124 A1 | 5/2005 | Stronach |
| 2005/0138073 A1 | 6/2005 | Zhou et al. |
| 2005/0182758 A1 | 8/2005 | Seitz et al. |
| 2005/0223022 A1 | 10/2005 | Weissman et al. |
| 2005/0246338 A1 | 11/2005 | Bird |
| 2006/0004750 A1 | 1/2006 | Huang et al. |
| 2006/0053112 A1 | 3/2006 | Chitkara et al. |
| 2006/0106473 A1 | 5/2006 | Enright et al. |
| 2006/0136363 A1 | 6/2006 | Nguyen et al. |
| 2006/0136469 A1 | 6/2006 | Dettinger et al. |
| 2006/0225072 A1 | 10/2006 | Lari et al. |
| 2006/0294065 A1 | 12/2006 | Dettinger et al. |
| 2007/0002869 A1 | 1/2007 | Miller |
| 2007/0043697 A1 | 2/2007 | Driesch, Jr. et al. |
| 2007/0143369 A1 | 6/2007 | Uppala |
| 2007/0239759 A1 | 10/2007 | Shen et al. |
| 2008/0071760 A1* | 3/2008 | Dettinger .......... G06F 17/30436 |
| 2008/0291926 A1 | 11/2008 | Hayashi |
| 2008/0310302 A1 | 12/2008 | Detwiler et al. |
| 2009/0063453 A1 | 3/2009 | Adler et al. |
| 2009/0063524 A1 | 3/2009 | Adler et al. |
| 2009/0077036 A1 | 3/2009 | Bent et al. |
| 2009/0077075 A1 | 3/2009 | Bent et al. |
| 2009/0083379 A1 | 3/2009 | Bent et al. |
| 2009/0157684 A1 | 6/2009 | Andersen et al. |
| 2009/0193006 A1 | 7/2009 | Herrnstadt |
| 2010/0094851 A1 | 4/2010 | Bent et al. |
| 2010/0094862 A1 | 4/2010 | Bent et al. |
| 2010/0094882 A1 | 4/2010 | Lee |
| 2010/0094892 A1 | 4/2010 | Bent et al. |
| 2010/0094902 A1 | 4/2010 | Vyvyan |
| 2010/0100556 A1 | 4/2010 | Correll, Jr. |
| 2011/0173219 A1 | 7/2011 | Bent et al. |
| 2012/0136898 A1 | 5/2012 | Bent et al. |
| 2012/0179720 A1 | 7/2012 | Seitz et al. |
| 2012/0303609 A1 | 11/2012 | Bent et al. |
| 2012/0323949 A1 | 12/2012 | Lee |

OTHER PUBLICATIONS

United States Patent and Trademark Office, Office Action for U.S. Appl. No. 12/248,082, Apr. 27, 2011, pp. 1-22, Alexandria, VA, USA.

United States Patent and Trademark Office, Notice of Allowance for U.S. Appl. No. 12/248,082, Nov. 30, 2011, pp. 1-14, Alexandria, VA, USA.

United States Patent and Trademark Office, Office Action for U.S. Appl. No. 12/248,109, Mar. 1, 2011, pp. 1-13, Alexandria, VA, USA.

United States Patent and Trademark Office, Office Action for U.S. Appl. No. 12/248,109, Sep. 1, 2011, pp. 1-20, Alexandria, VA, USA.

United States Patent and Trademark Office, Office Action for U.S. Appl. No. 12/248,109, Dec. 7, 2011, pp. 1-18, Alexandria, VA, USA.

United States Patent and Trademark Office, Office Action for U.S. Appl. No. 12/248,140, Apr. 13, 2011, pp. 1-15, Alexandria, VA, USA.

United States Patent and Trademark Office, Office Action for U.S. Appl. No. 12/248,140, Oct. 13, 2011, pp. 1-18, Alexandria, VA, USA.

United States Patent and Trademark Office, Office Action for U.S. Appl. No. 12/248,170, Mar. 17, 2011, pp. 1-12, Alexandria, VA, USA.

United States Patent and Trademark Office, Office Action for U.S. Appl. No. 12/248,170, Sep. 30, 2011, pp. 1-18, Alexandria, VA, USA.

United States Patent and Trademark Office, Office Action for U.S. Appl. No. 12/248,241, May 13, 2011, pp. 1-28, Alexandria, VA, USA.

United States Patent and Trademark Office, Office Action for U.S. Appl. No. 12/248,241, Nov. 9, 2011, pp. 1-33, Alexandria, VA, USA.

United States Patent and Trademark Office, Office Action for U.S. Appl. No. 12/248,304, Apr. 1, 2011, pp. 1-19, Alexandria, VA, USA.

United States Patent and Trademark Office, Office Action for U.S. Appl. No. 12/248,304, Sep. 19, 2011, pp. 1-25, Alexandria, VA, USA.

Boon-Chong Seet, et al., Route discovery optimization for dynamic source routing in mobile ad hoc networks, Article, Sep. 15, 2000, pp. 1-7, School of Computer Engineering, Nanyang Technological University, Singapore.

Roy Morien, Agile Development of the Database: A Focal Entity Prototyping Approach, Proceedings of the Agile Development Conference (ADC '05), 2005, pp. 103-110 (1-8), IEEE Computer Society, Published on the World Wide Web.

Joseph Sack, SQL Server 2008 Transact—SQL Recipes: Chapter 4—Tables, Book, Jul. 25, 2008, pp. 143-195, Springer-Verlag New York, Inc., New York, NY, USA.

United States Patent and Trademark Office, Office Action for U.S. Appl. No. 12/248,109, May 8, 2012, pp. 1-22, Alexandria, VA, USA.

United States Patent and Trademark Office, Notice of Allowance for U.S. Appl. No. 12/248,140, Jun. 21, 2012, pp. 1-30, Alexandria, VA, USA.

United States Patent and Trademark Office, Notice of Allowance for U.S. Appl. No. 12/248,170, May 24, 2012, pp. 1-24, Alexandria, VA, USA.

United States Patent and Trademark Office, Office Action for U.S. Appl. No. 12/248,241, Apr. 26, 2012, pp. 1-53, Alexandria, VA, USA.

United States Patent and Trademark Office, Office Action for U.S. Appl. No. 12/248,304, Jun. 19, 2012, pp. 1-21, Alexandria, VA, USA.

United States Patent and Trademark Office, Office Action for U.S. Appl. No. 13/364,728, Jun. 12, 2012, pp. 1-34, Alexandria, VA, USA.

(56) References Cited

OTHER PUBLICATIONS

Daniel Lopresti, et al., A Tabular Survey of Automated Table Processing, Proceedings of the Third International Workshop on Graphics Recognition, Recent Advances (GREC'99), 2000, pp. 93-120, Springer-Verlag, London, UK.

Esperanza Marcos, et al., A Methodological Approach for Object-Relational Database Design using UML, Article: Software System Model, vol. 2, Issue 1, Mar. 2003, pp. 59-72, Springer-Verlag, Published online.

United States Patent and Trademark Office, Notice of Allowance for U.S. Appl. No. 12/248,109, Jan. 25, 2013, pp. 1-19, Alexandria, VA, USA.

United States Patent and Trademark Office, Notice of Allowance for U.S. Appl. No. 12/248,241, Nov. 14, 2012, pp. 1-31, Alexandria, VA, USA.

United States Patent and Trademark Office, Office Action for U.S. Appl. No. 12/248,304, Jan. 17, 2013, pp. 1-17, Alexandria, VA, USA.

United States Patent and Trademark Office, Office Action for U.S. Appl. No. 12/248,304, Feb. 14, 2014, pp. 1-26, Alexandria, VA, USA.

United States Patent and Trademark Office, Office Action for U.S. Appl. No. 12/248,304, Nov. 20, 2014, pp. 1-18, Alexandria, VA, USA.

United States Patent and Trademark Office, Notice of Allowance for U.S. Appl. No. 12/248,304, Jul. 2, 2015, pp. 1-11, Alexandria, VA, USA.

United States Patent and Trademark Office, Office Action for U.S. Appl. No. 13/364,728, Nov. 8, 2012, pp. 1-31, Alexandria, VA, USA.

United States Patent and Trademark Office, Notice of Allowance for U.S. Appl. No. 13/364,728, May 20, 2013, pp. 1-21, Alexandria, VA, USA.

United States Patent and Trademark Office, Office Action for U.S. Appl. No. 13/561,659, Feb. 15, 2013, pp. 1-34, Alexandria, VA, USA.

United States Patent and Trademark Office, Notice of Allowance for U.S. Appl. No. 13/561,659, Aug. 29, 2013, pp. 1-22, Alexandria, VA, USA.

United States Patent and Trademark Office, Office Action for U.S. Appl. No. 13/594,157, Jan. 14, 2016, pp. 1-62, Alexandria, VA, USA.

* cited by examiner

NODE-LEVEL SUB-QUERIES IN DISTRIBUTED DATABASES

STATEMENT REGARDING FEDERALLY-SPONSORED RESEARCH OR DEVELOPMENT

This invention was made with Government support under W911NF-06-3-0001 awarded by United States Army. The Government has certain rights to this invention.

BACKGROUND

The present invention relates to systems and methods for distributing queries for processing at a specified subset of nodes in ad-hoc distributed database systems. More particularly, the present invention relates to node-level sub-queries in distributed databases.

Distributed databases include multiple databases accessible via a network or other interconnection by a querying computing node. The distributed databases may be logically distributed across multiple access or network domains and may be geographically distributed across physical locations. The querying computing node often uses a centralized registry to identify databases and physical data structures within the identified databases. The physical data structures are identified and accessible globally by name. Queries are issued to an identified database using an identified global name of a physical data structure. Query results are returned from the identified database in response to the issued query.

SUMMARY

The subject matter described herein provides node-level sub-queries in distributed databases. The node-level sub-queries described may be "pushed" to distributed database nodes that are known to have data that is independent of other data on a network of databases in an ad-hoc distributed database system. For purposes of the present subject matter, "ad-hoc" encompasses systems that are fit for purposes of the present subject matter with any kind of connection strategy that may be employed. A logical data structure (e.g., super-query) indicator is distributed in association with a distributed database query including at least one physical database sub-query and at least one database node identifier. If a receiving node determines that it is identified to process the query, the node executes the physical database query against a local physical database table. The node forms a local query response and, if instructed in association with the logical query indicator, adds its node identifier to the response. The physical database sub-query may also include an aggregation instruction that the user/application that issued the distributed query specifically requests to be applied in isolation on each distributed database node.

The aggregation may be requested to be applied because the user/application knows that the data in separate physical tables on each node is meaningful in the context of a specific node (e.g., the data is independent of other data at other nodes). Additionally, it may be known that aggregating the data between nodes would over-burden the distributed database network as a whole, such as in terms of consumption of network bandwidth, memory, and processor occupancy, and that the aggregation may also yield extraneous and/or incorrect results. Furthermore, to benefit from resource savings (e.g., in terms of processor occupancy, memory, and network bandwidth), the distribution of data in the network may intentionally be managed such that it is partitioned in such a way to make it possible to obtain required results from aggregation operations applied at a node-level. Aggregation at a node-level includes performing a join operation, a maximum result operation, a minimum result operation, and an average result operation on the query results. Furthermore, if an additional node is identified to execute the query, a node may forward the query including the logical query indicator to the additional node and may form a union of the results returned from the additional node with locally-aggregated results. The logical query indicator may also include executable code to be executed by distributed database nodes.

A method includes receiving a database query comprising a logical query indicator at a distributed database node within a distributed network of databases, where the logical query indicator comprises at least one physical database query and at least one database node identifier identifying at least one distributed database node to execute the physical database query; determining that the at least one database node identifier matches a local node identifier; executing the at least one physical database query against at least one local physical database table; forming a local query response comprising data retrieved from the at least one local physical database table; and responding to the database query with at least the local query response.

A system includes a memory adapted to store node-level sub-query information; and a processor programmed to: receive a database query comprising a logical query indicator at a distributed database node within a distributed network of databases, where the logical query indicator comprises at least one physical database query and at least one database node identifier identifying at least one distributed database node to execute the physical database query, determine that the at least one database node identifier matches a local node identifier, execute the at least one physical database query against at least one local physical database table, form a local query response comprising data retrieved from the at least one local physical database table, store the local query response to the memory, and respond to the database query with at least the local query response.

An alternative system includes a memory adapted to store node-level sub-query information; and a processor programmed to: receive a database query comprising a logical query indicator at a distributed database node within a distributed network of databases, where the logical query indicator comprises at least one physical database query, at least one database node identifier identifying at least one distributed database node to execute the physical database query, and at least one provenance indicator instructing distributed database nodes that process the at least one physical database query to add a node identifier to query responses, compare the at least one database node identifier with the local node identifier, determine that the at least one database node identifier matches the local node identifier, execute the at least one physical database query against at least one local physical database table, determine whether the at least one physical database query comprises a database aggregation operation comprising at least one of a join operation against at least two (2) local physical tables, a maximum result operation, a minimum result operation, and an average result operation on data retrieved from the at least one physical database tables; form a local query response comprising at least one of data retrieved from the at least one local physical database table and results of the database aggregation operation, store the local query response to the memory, and respond to the database query with the data received in association with the at least one distributed query response aggregated with the local query response.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

Figure 1:
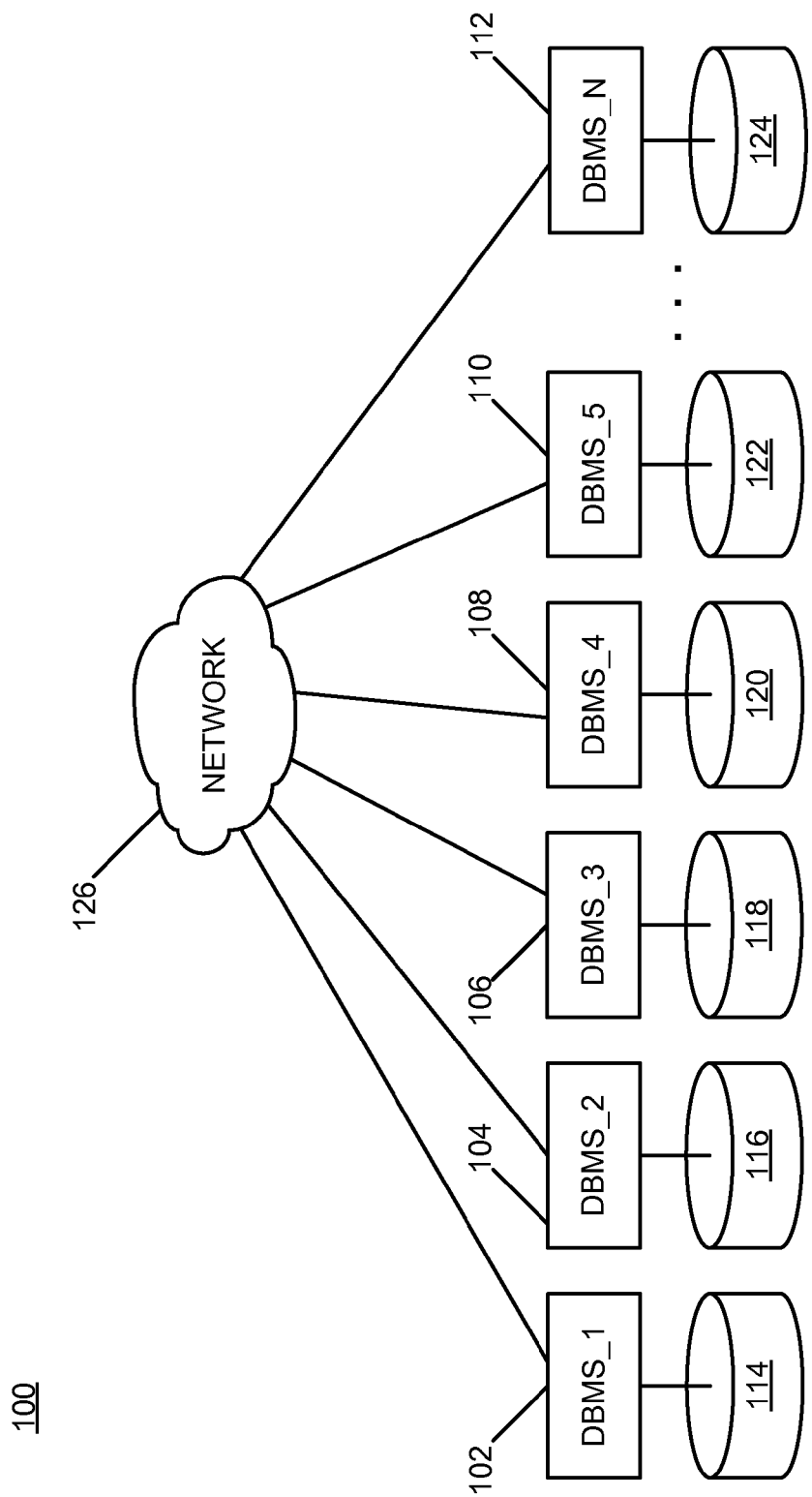
FIG. 1 is a block diagram of an example of an implementation of a system for execution of node-level sub-queries in distributed databases according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides node-level sub-queries in distributed databases. The node-level sub-queries described may be "pushed" to distributed database nodes that are known to have data that is independent of other data on a network of databases in an ad-hoc distributed database system. For purposes of the present subject matter, "ad-hoc" encompasses systems that are fit for purposes of the present subject matter with any kind of connection strategy that may be employed. A logical data structure (e.g., super-query) indicator is distributed in association with a distributed database query including at least one physical database sub-query and at least one database node identifier. If a receiving node determines that it is identified to process the query, the node executes the physical database query against a local physical database table. The node forms a local query response and, if instructed in association with the logical query indicator, adds its node identifier to the response. The physical database sub-query may also include an aggregation instruction that the user/application that issued the distributed query specifically requests to be applied in isolation on each distributed database node.

The aggregation may be requested to be applied because the user/application knows that the data in separate physical tables on each node is meaningful in the context of a specific node (e.g., the data is independent of other data at other nodes). Additionally, it may be known that aggregating the data between nodes would over-burden the distributed database network as a whole, such as in terms of consumption of network bandwidth, memory, and processor occupancy, and that san aggregation would also yield extraneous and/or incorrect results. Furthermore, to benefit from resource savings (e.g., in terms of processor occupancy, memory, and network bandwidth), the distribution of data in the network may intentionally be managed such that it is partitioned in such a way to make it possible to obtain required results from aggregation operations applied at a node-level. Aggregation at a node-level includes performing a join operation, a maximum result operation, a minimum result operation, and an average result operation on the query results. Furthermore, if an additional node is identified to execute the query, a node may forward the query including the logical query indicator to the additional node and may form a union of the results returned from the additional node with locally-aggregated results. The logical query indicator may also include executable code to be executed by distributed database nodes.

It is assumed for purposes of the present subject matter that knowledge of distributed database tables and their locations in association with certain distributed database nodes are available to a node that originates a query. It is also assumed that data associated with certain of the distributed database tables at certain distributed database nodes is independent of data associated with certain other distributed database nodes. As such, a query may be more efficiently routed and processed within a network of distributed databases by use of a logical query indicator. An originating node may specify which distributed database nodes are to process a logical query indicator by use of a node identifier associated with the logical query indicator. As described above, a logical query indicator also includes at least one physical database query to be executed by selected nodes within the distributed network of databases. Accordingly, the logical query indicator encapsulates physical database queries to be executed by specific database nodes within a distributed network of databases that store information that is independent of other information within the network.

The node-level sub-queries in distributed databases described herein may be performed in real time to allow prompt execution of sub-queries at specified distributed database nodes within a distributed database system. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

FIG. 1 is a block diagram of an example of an implementation of a system 100 for execution of node-level sub-queries in distributed databases. Within the system 100, a database management system_1 (DBMS_1) 102, a DBMS_2 104, a DBMS_3 106, a DBMS_4 108, a DBMS_5 110, up to a DBMS_N 112 are illustrated. The DBMS_1 102 through the DBMS_N 112 are each associated with a database 114, a database 116, a database 118, a database 120, a database 122, up to a database 124, respectively. The DBMS_1 102 through the DBMS_N 112 are interconnected via a network 126.

For purposes of the present description, it should be noted that while the network 126 is illustrated as interconnecting the DBMS_1 102 through the DBMS_N 112 with each other, this should not be considered limiting. The network 126 may be formed by any interconnection appropriate for use in a distributed database environment. For example, the network 126 may include any form of interconnection suitable for the intended purpose, including a private or public network such as an intranet or the Internet, respectively, direct inter-module interconnection, dial-up, or any other interconnection mechanism capable of interconnecting the devices with the system 100.

As such, any two or more of the DBMS_1 102 through the DBMS_N 112 may be interconnected by proximity, interconnection, or routing capabilities within the system 100, while certain other of the devices may not have interconnectivity other than via other distributed database devices. Accordingly, certain of the DBMS_1 102 through the DBMS_N 112 may not be capable of communication with one another other than via the other distributed database devices.

As will be described in more detail below in association with FIGS. 2 through 6 below, the DBMS_1 102 through the DBMS_N 112 provide node-level sub-queries within the system 100. The node-level sub-queries in distributed databases is based upon propagation of a logical query indicator, and an associated physical database query and node identifier, instructing the identified node to execute the physical database query.

It should be noted that the DBMS_1 102 through the DBMS_N 112 may be any type of device configurable for storage of information and distributed interconnectivity for database-style queries. For example, the DBMS_1 102 through the DBMS_N 112 may include devices such as a personal computer (e.g., desktop, laptop, palm, etc.) or a handheld device (e.g., cellular telephone, personal digital assistant (PDA), email device, music recording or playback device, etc.), or any other device capable of processing information as described above and in more detail below.

Figure 2:
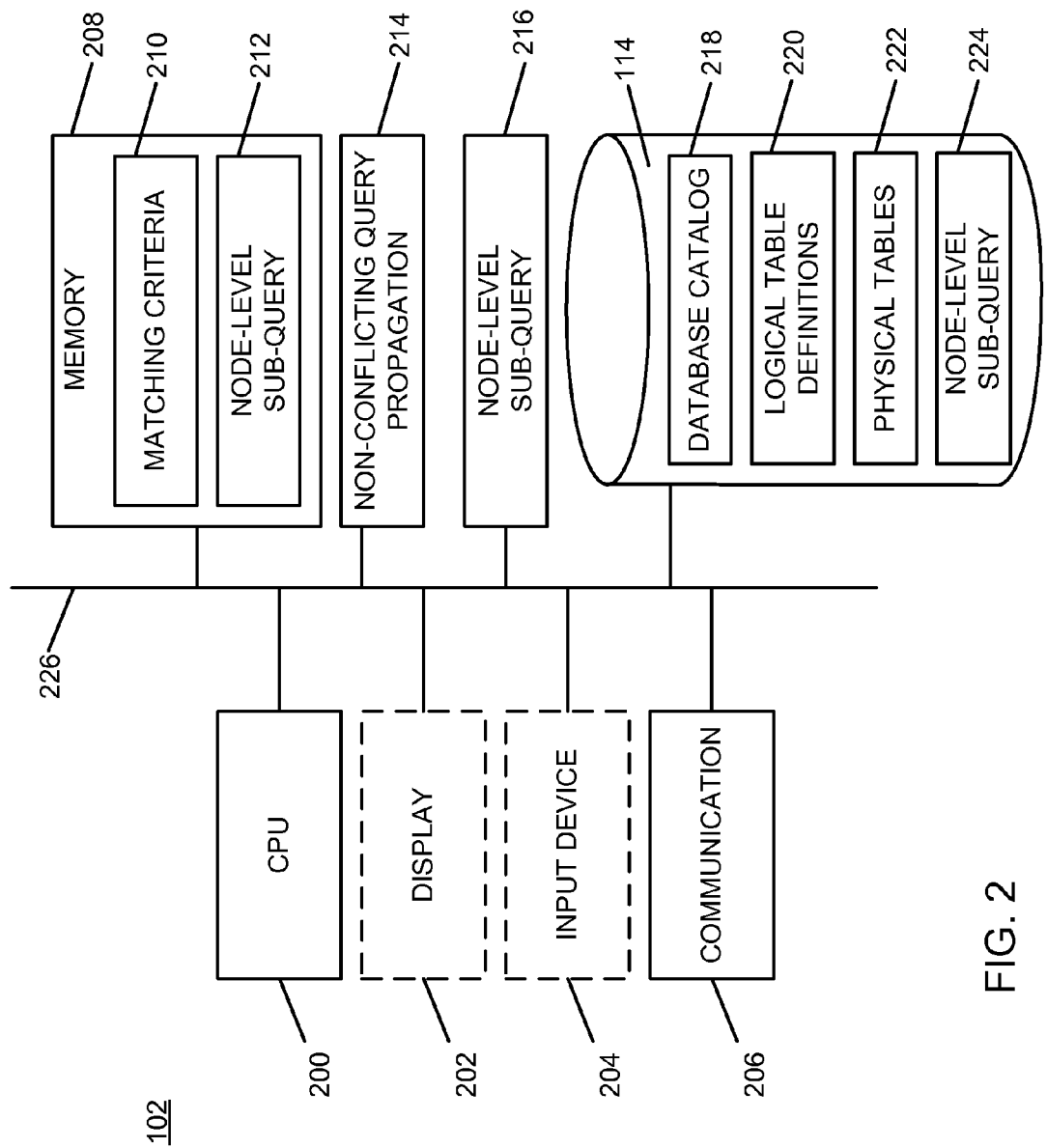
FIG. 2 is a block diagram of an example of an implementation of a database management system that is capable of performing node-level sub-queries based upon propagation of a logical query indicator, and an associated physical database query and node identifier, in association with a database query within a distributed database system according to an embodiment of the present subject matter.

FIG. 2 is a block diagram of an example of an implementation of the DBMS_1 102 that is capable of performing node-level sub-queries based upon propagation of a logical query indicator, and an associated physical database query and node identifier, in association with a database query within a distributed database system, such as the system 100. A central processing unit (CPU) 200 provides computer instruction execution, computation, and other capabilities within the DBMS_1 102. A display 202 provides visual information to a user of the DBMS_1 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they are not required components for the DBMS_1 102. Accordingly, the DBMS_1 102 may operate as a completely automated embedded device without user configurability or feedback. However, the DBMS_1 102 may also provide user feedback and configurability via the display 202 and the input device 204, respectively.

A communication module 206 provides interconnection capabilities that allow the DBMS_1 102 to communicate with other modules within the system 100, such as the DBMS_2 104 through the DBMS_N 112, to perform node-level sub-queries within the system 100. The communication module 206 may include any electrical, protocol, and protocol conversion capabilities useable to provide the interconnection capabilities.

A memory 208 includes a matching criteria storage area 210 that stores information usable to identify processing preferences or priorities for non-conflicting queries within the system 100. The matching criteria stored within the matching criteria storage area 210 are used to configure and control query data selection and processing, query forwarding, and query responses. The memory 208 also includes a node-level sub-query information storage area 212 that stores node-level sub-query information usable to process received physical database queries in association with a logical query indicator within the system 100. As will be described in more detail below, the node-level sub-query information stored within the node-level sub-query information storage area 212 is used to store the received logical query indicator, node identifiers, received physical database queries, received executable code segments, and other information to facilitate node-level sub-queries within the system 100. The node-level sub-query information may also be used to identify nodes that are designated to receive and process the logical query indicator and associated physical database query and to forward the logical query indicator to the respective nodes for processing.

A non-conflicting query propagation module 214 is illustrated. The non-conflicting query propagation module 214 provides query processing, query forwarding, and query response capabilities for the DBMS_1 102. A node-level sub-query module 216 is also illustrated. The node-level sub-query module 216 provides the node-level sub-query capabilities for distributed database devices, such as the DBMS_1 102, as described above and in more detail below.

Though the communication module 206, the non-conflicting query propagation module 214, and the node-level sub-query module 216 are illustrated as component-level modules for ease of illustration and description purposes, it should be noted that these modules include any hardware, programmed processor(s), and memory used to carry out the respective functions of the modules as described above and in more detail below. For example, the communication module 206, the non-conflicting query propagation module 214, and the node-level sub-query module 216 may include additional controller circuitry in the form of application specific integrated circuits (ASICs), processors, antennas, and/or discrete integrated circuits and components for performing communication and electrical control activities associated with the respective modules. Additionally, the communication module 206, the non-conflicting query propagation module 214, and the node-level sub-query module 216 also include interrupt-level, stack-level, and application-level modules as appropriate. Furthermore, these modules include any memory components used for storage, execution, and data processing for performing processing activities associated with the respective modules. The communication module 206, the non-conflicting query propagation module 214, and the node-level sub-query module 216 may also form a portion of other circuitry described without departure from the scope of the present subject matter.

The database 114 provides storage capabilities for information associated with the automated propagation of non-conflicting queries and node-level sub-query capabilities of the DBMS_1 102. The database 114 includes a database catalog storage area 218, a logical table definition storage area 220, a physical table storage area 222, and a node-level sub-query storage area 224 that may be stored in the form of tables or other arrangements accessible by the DBMS_1 102.

The database catalog storage area 218 stores information associated with logical tables stored at other database management systems, such as the DBMS_2 104 through the DBMS_N 112, within the system 100. The information stored within the database catalog storage area 218 may be compiled in response to queries of other database nodes within the system 100 for logical table definitions stored at those other nodes. As such, the DMBS_1 102 may determine and store logical table definitions for other nodes within the system 100 for use during query processing.

The logical table definition storage area 220 stores information about logical tables stored locally to the DBMS_1 102. The logical tables map to physical data and physical tables stored within the physical table storage area 222. The physical table storage area 222 stores physical tables that may or may not be federated within a distributed database system, such as the system 100, based upon mappings defined within the respective logical table definition storage area 220.

The node-level sub-query storage area 224 stores information associated with the received distributed database responses and other information processed by the node-level sub-query module 216. As will be described in more detail below beginning with FIG. 3, logical query indicators are associated with database queries. Upon receipt of a database query including a logical query indicator, the receiving distributed database node, such as the DBMS_1 102, determines whether a physical database query and at least one distributed database node identifier were received with the query in association with the received logical query indicator. The DBMS_1 102 determines whether its local node identifier matches one of the received node identifiers. Upon determination of a matching node identifier, the DBMS_1 102 executes the received physical database query against at least one local physical database table and forms a local query response. If the DBMS_1 102 determines that an additional database node is identified in association with the logical query indicator, the DBMS_1 102 forwards the query to the additional distributed database node. The DBMS_1 102 may aggregate received query responses with the local query response and return either the local query response or the aggregated response to the originating node for processing.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The CPU 200, the display 202, the input device 204, the communication module 206, the memory 208, the non-conflicting query propagation module 214, the node-level sub-query module 216, and the database 114 are interconnected via an interconnection 226. The interconnection 226 may include a system bus, a network, or any other interconnection capable of providing the respective components with suitable interconnection for the respective purpose.

While the DBMS_1 102 is illustrated with and has certain components described, other modules and components may be associated with the DBMS_1 102 without departure from the scope of the present subject matter. Additionally, it should be noted that, while the DBMS_1 102 is described as a single device for ease of illustration purposes, the components within the DBMS_1 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the DBMS_1 102 are possible and all are considered within the scope of the present subject matter. It should also be understood that, though the database catalog storage area 218, the logical table definition storage area 220, the physical table storage area 222, and the node-level sub-query storage area 224 are shown within the database 114, they may also be stored within the memory 208 without departure from the scope of the present subject matter. Accordingly, the DBMS_1 102 may take many forms and may be associated with many platforms.

Based upon the description above, node-level sub-queries in the context of query processing will now be described. It is understood that any of the DBMS_1 102 through the DBMS_N 112 may originate a query for purposes of the following examples. An originated query may be propagated to one or more of the distributed database nodes from each node as the query progresses through the system 100. Responses to the query are propagated to the originating node for processing and/or may be processed by each node on the return path for validation or other purposes. Accordingly, many possibilities exist for node-level sub-query processing and all are considered within the scope of the present subject matter.

Regarding an example query format that may be used for node-level sub-queries, the following example Query1 represents a pseudo-query format for one possible implementation of a node-level sub-query. As will be described in more detail below, the example Query1 instructs receiving distributed database nodes to execute a sub-query on each node that joins two physical tables called, "Customers" and "Accounts," using a "join" predicate matching the user identification fields of each table. For purposes of the present example Query1, it is assumed that it is known in advance of formation of the Query1 that the desired information is stored on one or more of the DBMS_1 102 through the DBMS_3 106.

```
select * from LogicalQuery (                                    (Query1)
    'select C.Name, A.Balance from Customers C,
    Accounts A
    where C.UserID = A.UserID and A.Balance > 1000',
    'with_provenance',
    'DATA_SOURCE_LIST=
    CUSTOMER_ACCOUNTS') as LQ
    where ProvenanceNode < 'DBMS_4 108'
```

As can be seen from the pseudo-query format for the example Query1, a query is formed using a "select" query identifier. The asterisk character (i.e., "*") following the select query identifier represents a wild card character to indicate that all results associated with the query specification are to be returned. The Query1 instructs receiving distributed database nodes to use logical query processing activities for fulfillment of the Query1 with the phrase "from LogicalQuery." The phrase "LogicalQuery" and the parenthetically delimited information following it represent a logical query indicator for purposes of the present subject matter. As can be seen from the example pseudo-query format of the Query1, several elements are associated with the logical query indicator.

An embedded physical query is formed using an embedded "select" query identifier within the parenthetical expression. The embedded select identifier is followed by column names referenced to specific tables. Within the present example, tables named "Customers C" and "Accounts A" are referenced within the column name indicators as "C.Name" and "A.Balance." As such, the query requests data from columns named "Name" within the customers table "C" and for columns named "Balance" within the accounts table "A." The example embedded physical query is further refined by the addition of a "where" operator that specifies matching criteria for the embedded physical query. Within the present example, the "where" operator is followed by the phrase "C.UserID=A.UserID and A.Balance>1000." As such, data is returned for rows where the user identifier (UserID) matches for each table and the balance within the "Balance" column of the accounts table "A" is greater than one thousand dollars (e.g., $1,000).

It should be noted that the present example Query1 includes only one embedded physical query. However, it is understood that a logical query indicator may include more than one embedded physical query. As such, a logical query indicator may include more than one physical database query for execution at a given node. Additionally, a logical query indicator may include different physical database queries to be executed by different distributed database nodes without departure from the scope of the present subject matter.

A provenance indicator "with provenance" is also included within logical query indicator. The provenance indicator instructs nodes to add their respective node identifiers to query results returned in response to the Query1 based upon processing of the embedded physical query. The phrase "DATA_SOURCE_LIST=CUSTOMER_ACCOUNTS" represents a further instruction to query all tables on each node that are exposed by the respective node's federated databases associated with the 'CUSTOMER_ACCOUNTS' data source list. A portion of an example node configuration file is shown below as the example ConfigurationFile1 to further illustrate the use of a data source list on the distributed database nodes.

---

Example ConfigurationFile1 for a Distributed Database Node

---

```
...
CUSTOMER_ACCOUNTS_DATA_SOURCE_LIST =
ACCOUNTS_DB2,
ACCOUNTS_TEMP_FILE
...
ACCOUNTS_DB2_URL = jdbc:db2://localhost:50000/accounts
ACCOUNTS_DB2_USR = 'ibm_user'
ACCOUNTS_DB2_PWD = 'password'
...
ACCOUNTS_TEMP_FILE_PATH =
C:\CUSTOMER_ACCOUNTS\TEMP_ACCOUNTS.DAT
...
```

---

As can be seen from the example ConfigurationFile1, the phrase "CUSTOMER_ACCOUNTS_DATA_SOURCE_LIST=ACCOUNTS_DB2, ACCOUNTS_TEMP_FILE" references two data sources "ACCOUNTS_DB2" and "ACCOUNTS_TEMP_FILE," each of which exposes two physical tables, "Customer" and "Accounts." The first data source is a database connection and the second data source is a flat file. Both of these data sources store and are the data sources for the "Customer" and "Accounts" tables associated with the embedded physical query of the example Query1. When the example Query1 is issued, both data sources are queried and the results from both data sources are aggregated via a union operation. As can also be seen from the example ConfigurationFile1, a uniform resource locator (URL), a user name (USR), a password, and a temporary path to a data file are also represented. Further description of these additional fields will not be provided as further description of these fields is considered to be outside of the scope of the present subject matter. As such, each distributed database node, such as the DBMS_1 102 through the DBMS_N 112, may include a configuration file that allows processing of embedded physical database queries to be performed by any node that is instructed to execute the queries in association with the logical query indicator.

Returning to the description of the example Query1, the phrase "as LQ" within the Query1 is an alias to a composite name for the logical query, again listed as "LQ" within the present example. The final portion of the example Query1 is represented by the example node identification phrase "where ProvenanceNode<'DBMS_4 108'." This example node identification phrase represents multiple node identifiers that identify which of the distributed database nodes within the system 100 are instructed to execute the embedded physical query. Within the present example the node identification phrase instructs all nodes with a node identifier less than "DBMS_4 108" to execute the embedded query within the logical query identifier of the example Query1. As such, as described above, the DBMS_1 102 through the DBMS_3 106 will process the present example Query1. Other distributed database nodes may forward the Query1 to other interconnected nodes for routing to the respective nodes that are instructed to execute the embedded physical query. Each distributed database node may parse the logical query indicator to determine which nodes are instructed to execute the embedded physical query.

Accordingly, the embedded query returns all customer names and associated balances where the balance is greater than one thousand dollars ($1000), from all hosts whose hostnames are lexicographically less than "DBMS_4 108." The query also returns provenance information in separate columns, one of which is called "ProvenanceNode." Finally, the "Customers" and "Accounts" tables queried on each node will be all those that are exposed by the node's federated databases associated with the respective "CUSTOMER_ACCOUNTS" data source list.

It should be noted that for purposes of the present description, a virtual table interface may be formed based upon the logical table definitions. The virtual table interface may be defined as a set of interfaces for representation of physical data for encapsulation and abstraction of the physical data within a distributed network of databases, such as the system 100. Class definitions may be constructed for creation and representation of the logical table definitions. For example, a class for a query may be defined in a syntactic representation, such as Java, to accept logical table name as an argument of a class constructor. A logical table definition may also be passed as a second argument to the class constructor. Upon instantiation, a query object may be created with the logical table name and definition associated with the query object. Distributed database nodes may make calls into the query object for logical table information and processing.

It should also be noted that though the example Query1 does not include communicated matching criteria, it is understood that the Query1 may be modified to include matching criteria without departure from the scope of the present subject matter. Further, matching criteria may be either communicated with the queries or may be stored locally in advance of issuance of a query. As such, default matching criteria may be established and stored within the matching criteria storage area 210 of the memory 208 at each distributed database node. For example, default matching may be strict matching for column name, column position within a logical table, column name data type, column name data precision, and other factors. Issued queries may modify default matching criteria to pass additional or alternative matching criteria instructing the receiving distributed database nodes to match based upon the additional matching criteria or to change default matching criteria. Example additional or alternative matching criteria include matching a column name in any position of a logical table, matching data precision based upon equal or greater precision within the respective logical table definitions, and other matching criteria. There are many other possible matching criteria that may be used and all are considered within the scope of the present subject matter.

It should further be noted that additional functionality may be associated with a logical query indicator. For example, executable code may be passed to specific nodes within the system 100 for execution using a logical query indicator. The executable code may be in the form of an interpretive or a compiled format. The executable code may also include procedure, function, or method calls into local executable code or objects, may include updated executable code to be loaded into local memory (e.g., the memory 208) to update functionality of the local node, and may include any other form of executable code. Many other forms of executable code are possible and all are considered to be within the scope of the present subject matter.

Additionally, execution of the executable code at a distributed database node may include issuing a procedure, function, or method call to a local object or operating system. Execution of the executable code may also include storing the executable code to a memory, such as the memory 208, and invoking an executable code handler (not shown) associated with the local database node. Many other operations to execute received executable code are possible and all are considered to be within the scope of the present subject matter. It should additionally be noted that any code execution result, such as a data value, status of a code execution update, return code, or other code execution result may be passed back with a local query result, as described in more detail below.

Figure 3:
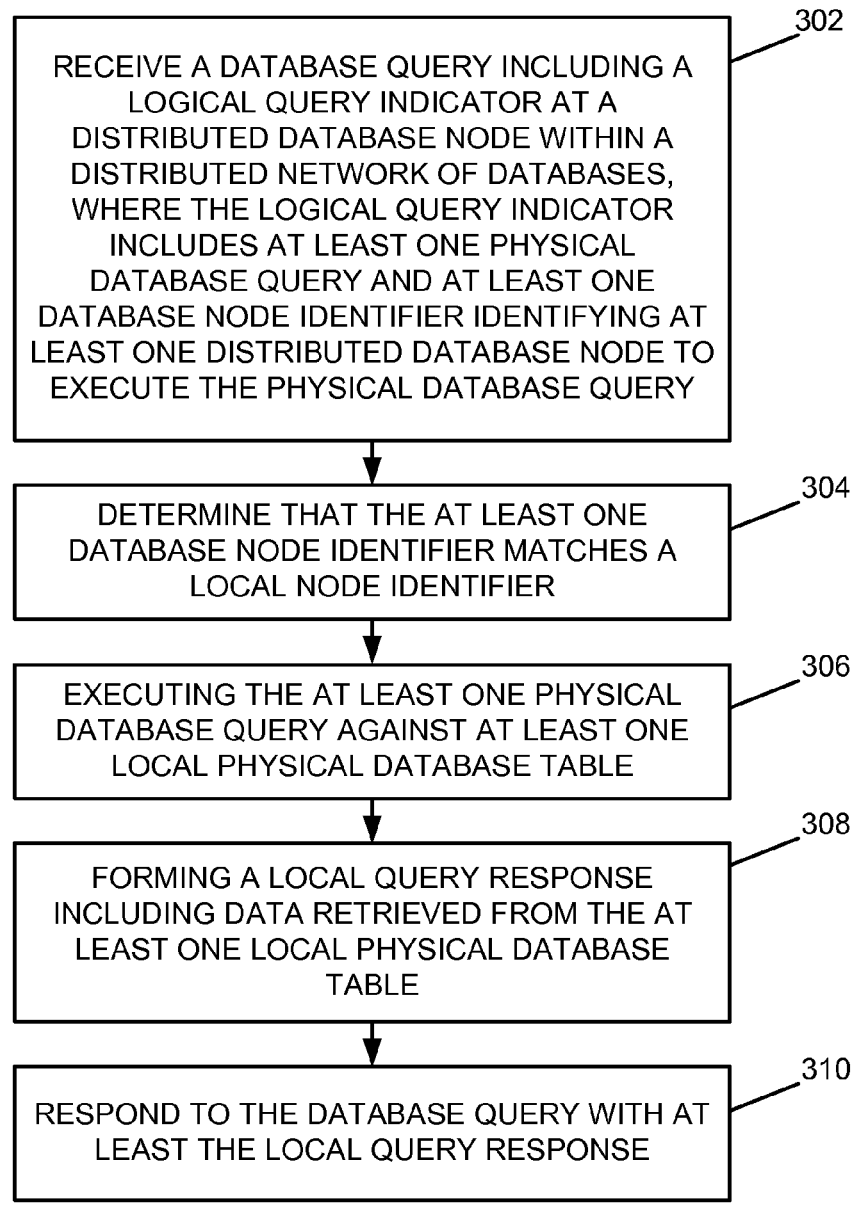
FIG. 3 is a flow chart of an example of an implementation of a process for node-level sub-queries in distributed databases according to an embodiment of the present subject matter.
Figure 4:
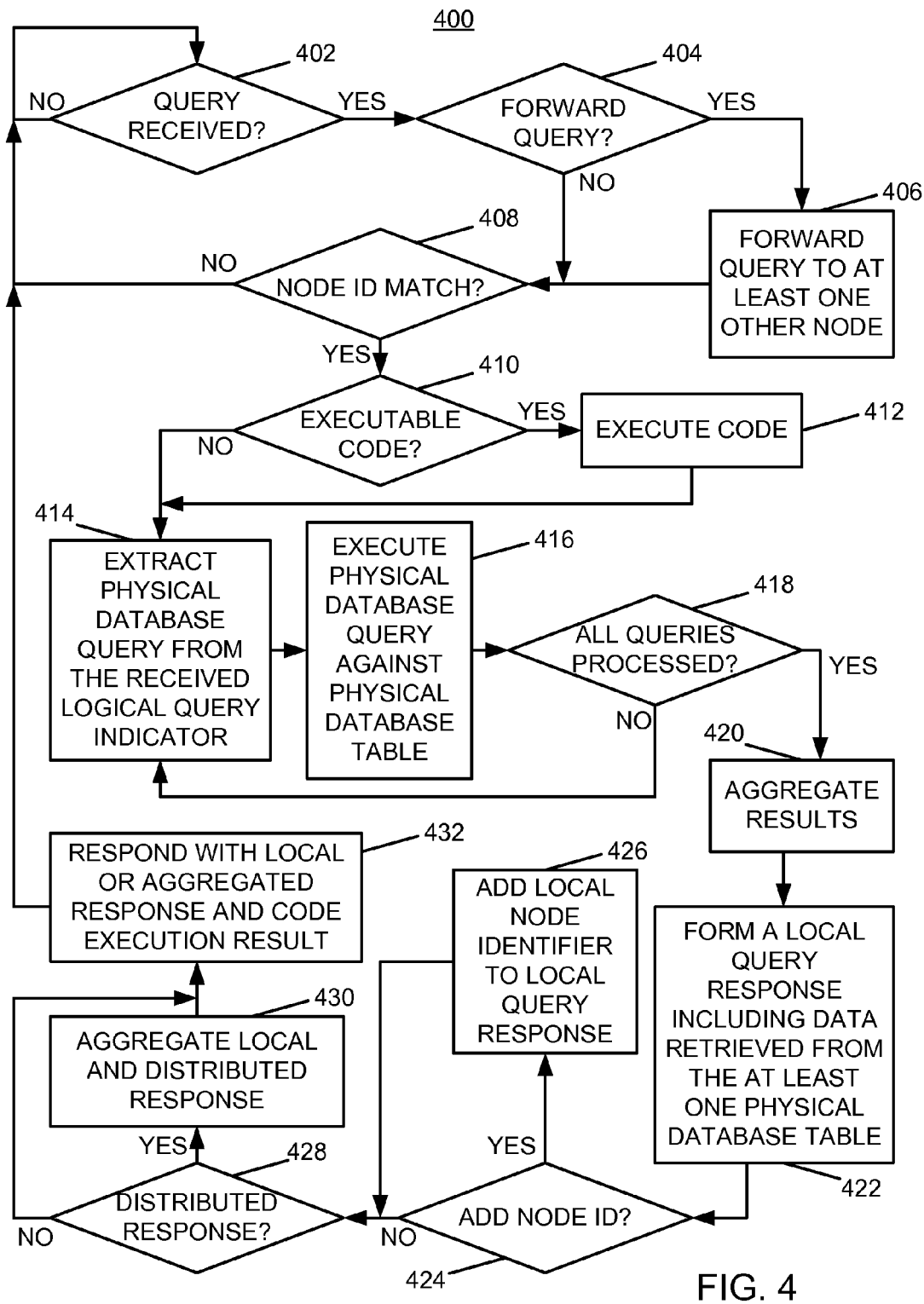
FIG. 4 is a flow chart of an example of an implementation of a process for node-level sub-queries and execution of received executable code in distributed databases according to an embodiment of the present subject matter.

FIGS. 3 and 4 below describe example processes that may be executed by distributed database devices, such as the DBMS_1 102 through the DBMS_N 112, to perform the node-level sub-queries associated with the present subject matter. The example processes may be performed by modules, such as the node-level sub-query module 216 and/or the CPU 200, associated with distributed database devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for node-level sub-queries in distributed databases. At block 302, the process 300 receives a database query including a logical query indicator at a distributed database node within a distributed network of databases, where the logical query indicator includes at least one physical database query and at least one database node identifier identifying at least one distributed database node to execute the physical database query. At block 304, the process 300 determines that the at least one database node identifier matches a local node identifier. At block 306, the process 300 executes the at least one physical database query against at least one local physical database table. At block 308, the process 300 forms a local query response including data retrieved from the at least one local physical database table. At block 310, the process 300 responds to the database query with at least the local query response.

FIG. 4 is a flow chart of an example of an implementation of a process 400 for node-level sub-queries and execution of received executable code in distributed databases. At decision point 402, the process 400 makes a determination as to whether a query has been received. As described above, for purposes of the present subject matter, a received query includes a logical query indicator. The logical query indicator further includes at least one physical database query and at least one database node identifier. The at least one database node identifier designates which distributed database nodes within a distributed database system are to process the query.

When a determination is made at decision point 402 that a query including a logical query indicator has been received, the process 400 makes a determination at decision point 404 as to whether to forward the received query to an additional node or nodes for processing. Though not depicted within FIG. 4 for ease of illustration purposes, the determination to forward the received query is based upon analysis of the received at least one database node identifier to identify another distributed database node that is requested to process the received query. Within a distributed network of databases, such as the system 100, nodes may receive and forward queries for processing at other nodes.

When a determination is made at decision point 404 to forward the received query, the process 400 forwards the query to at least one other distributed database node at block 406. When a determination is made at decision point 404 not to forward the received query or when the query has been forwarded, the process 400 makes a determination as to whether there is a node identifier match between the received at least one database node identifier and a local node identifier at decision point 408. A match indicates that the query is to be processed locally.

When a determination is made that there is not a node identifier match and that the query is not to be processed locally, the process 400 returns to decision point 402 to continue iterating as described above. When a determination is made that there is a node identifier match and that the query is to be processed locally, the process 400 makes a determination as to whether there is executable code associated with the received logical query indicator at decision point 410. Processing to determine whether there is executable code associated with the received logical query indicator includes parsing the received logical query indicator to identify the respective portions of the logical query indicator to identify an executable segment of code.

As described above, executable code may be passed to specific nodes within the system 100 for execution. The executable code may be in the form of an interpretive or a compiled format. The executable code may also include procedure, function, or method calls into local executable code or objects, may include updated executable code to be loaded into local memory (e.g., the memory 208) to update functionality of the local node, and may include any other form of executable code. Many other forms of executable code are possible and all are considered to be within the scope of the present subject matter.

When a determination is made at decision point 410 that executable code is associated with the received logical query indicator, the process 400 executes the received executable code at block 412. As also described above, execution of the received executable code may include issuing a received procedure, function, or method call to a local object or operating system. Execution of the received executable code may also include storing the executable code to a memory, such as the memory 208, and invoking an executable code handler (not shown) associated with the local database node. Many other operations to execute received executable code are possible and all are considered to be within the scope of the present subject matter. It should additionally be noted that any code execution result, such as a data value, status of a code execution update, return code, or other code execution result may be passed back with a local query result, as described in more detail below.

When a determination is made at decision point 412 that executable code is not associated with the received logical query indicator or when any received executable code has been executed, the process 400 extracts a physical database query from the received logical query indicator at block 414. As described above, a logical query indicator may include more than one physical database query for execution at a given node and may also include different physical database queries to be executed by different distributed database nodes. Accordingly, the process 400 may execute more than one physical database query.

For purposes of the present subject example, it should be understood that the received physical sub-query, including any associated aggregation operation request, may be pushed further down from a logical database node level to a data source level for processing and for aggregating any results (e.g., by a join, maximum, minimum, and/or averaging operation). The aggregated results may be returned to the logical database node level for continued processing. The example process 400 is not partitioned into multiple flow charts for ease of illustration purposes. However, it is noted that the description of processing at block 414 through block 420 may be performed at a data source level without departure from the scope of the present subject matter.

At block 416, the process 400 executes the physical database query against a physical database table and receives results from the physical database table. It should also be noted that if the physical query includes a logical query, the query may be forwarded to the network for processing at block 416 and a response may be received from any distributed database nodes that process the forwarded query. Additional processing for this aspect of the process 400 is not illustrated for ease of illustration purposes.

At decision point 418, the process 400 makes a determination as to whether all physical database queries have been processed. When a determination is made that at least one additional physical database query is to be processed, the process 400 returns to block 414 to iterate as described above. When a determination is made that all physical database queries have been processed, the process 400 aggregates results if more than one physical query was performed at block 420. As described above, aggregation for purposes of a sub-query may include, for example, performing a database "join" operation, a maximum result operation, a minimum result operation, and an average result operation.

At block 422, the process 400 forms a local query response including data or aggregated data retrieved from the at least one physical database tables. At decision point 424, the process 400 makes a determination as to whether to add the local node identifier to the local query response. The determination to add the local node identifier to the local query response may be based upon receipt of a provenance indicator, as described above, or may be based upon configuration parameters or other indications.

When a determination is made to add the local node identifier to the local query response, the process 400 adds the local node identifier to the local query response at block 426. When a determination is made not to add the local node identifier to the local query response or when the local node identifier has been added to the local query response, the process 400 makes a determination at decision point 428 as to whether a distributed database response has been received in response to the forwarded a query at block 406, as described above. When a determination is made that a query response has been received, the process 400 aggregates the local query response with any received distributed query responses at block 430. For purposes of the present subject matter, an aggregation operation of the local query response with any received distributed query responses at block 430 would typically be a union operation. When a determination is made that a query response has not been received or when the local and received query responses have been aggregated, the process 400 responds with the local query response or the aggregated query responses, and any code execution result at block 432 and returns to decision point 402 to await another query.

It should be understood that query processing may be asynchronous in nature, such that a query response may or may not be received at a given point within a given process, such as the process 400. However, for purposes of the present example, it is assumed that sufficient distributed database processing and network speed are available such that the process 400 will have received a query response for a forwarded query by the time the process 400 considers the determination at decision point 428. As such, the process 400 may make the determination at decision point 428 without waiting or further processing. Additional processing for situations where distributed database processing or network speed result in additional processing requirements may be added to the process 400 without departure from the scope of the present subject matter.

It should also be understood that if the received query was forwarded to more than one other distributed database node at block 406, more than one query response may be anticipated to be returned. The example process 400 represents processing for a single query receipt. However, additional processing for more than one received query response may be added to the process 400 without departure from the scope of the present subject matter.

As such, the process 400 provides node-level sub-queries and execution of received executable code in distributed databases. The process 400 forwards the received query to additional nodes and processes the query locally based upon the received at least one node identifier. Physical database queries embedded within the received logical query indicator are extracted from the logical query indicator and executed. Data results from the executed physical database queries may be aggregated (e.g., a join operation, a maximum operation, a minimum operation, and a averaging operation) and data results received in response to forwarding of the query may be aggregated (e.g., a union) using database aggregation operations.

As described above in association with FIGS. 1 through 4, the example systems and processes provide node-level sub-queries in distributed databases. Many other variations and additional activities associated with node-level sub-queries are possible and all are considered within the scope of the present subject matter.

Those skilled in the art will recognize, upon consideration of the above teachings, that certain of the above exemplary embodiments are based upon use of a programmed processor such as CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A computer program product, comprising:
a non-transitory computer readable storage memory having computer readable program code embodied therewith, where the computer readable program code when executed on a computer causes the computer to:
receive a database logical query comprising a logical query indicator at a distributed database management system (DBMS) within a distributed network of database management systems, where the logical query indicator encapsulates within the received database logical query at least one physical database query and the logical query indicator further comprises at least one provenance indicator that instructs distributed database management systems that process the at least one encapsulated physical database query to add a database management system identifier to query responses, and the database logical query comprises at least one database management system identifier that identifies at least one distributed DBMS to execute the encapsulated physical database query against a physical database managed by the at least one distributed DBMS;
determine that the at least one database management system identifier matches a local database management system identifier;
execute the at least one encapsulated physical database query against at least one local physical database table within the physical database managed by the at least one distributed DBMS;
form a local query response comprising data retrieved from the at least one local physical database table;
add the local database management system identifier to the local query response in response to the at least one provenance indicator; and
respond to the database logical query with at least the local query response.

2. The computer program product of claim 1, where, in causing the computer to determine that the at least one database management system identifier matches the local database management system identifier, the computer readable program code when executed on the computer causes the computer to compare the at least one database management system identifier with the local database management system identifier.

3. The computer program product of claim 1, where the at least one local physical database table comprises at least two local physical database tables and where, in causing the computer to form the local query response, the computer readable program code when executed on the computer causes the computer to perform a database aggregation operation on data retrieved from the at least two local physical database tables.

4. The computer program product of claim 3, where, in causing the computer to perform the database aggregation operation on the data retrieved from the at least two local physical database tables, the computer readable program code when executed on the computer causes the computer to perform at least one of a join operation, a maximum result operation, a minimum result operation, and an average result operation on the data retrieved from the at least two local physical database tables.

5. The computer program product of claim 1, where the computer readable program code when executed on the computer further causes the computer to determine that the at least one database management system identifier comprises at least one additional database management system identifier other than the local database management system identifier.

6. The computer program product of claim 5, where the computer readable program code when executed on the computer further causes the computer to forward the database logical query comprising the logical query indicator to at least one additional distributed database management system associated with the at least one additional database management system identifier.

7. The computer program product of claim 6, where the computer readable program code when executed on the computer further causes the computer to receive at least one distributed query response from the at least one additional distributed database management system, perform a database aggregation operation of data received in association with the at least one distributed query response with the local query response, and where, in causing the computer to respond to the database logical query with at least the local query response, the computer readable program code when executed on the computer causes the computer to respond to the database logical query with the data received in association with the at least one distributed query response aggregated with the local query response.

8. The computer program product of claim 7, where, in causing the computer to perform the database aggregation operation of data received in association with the at least one distributed query response with the local query response, the computer readable program code when executed on the computer causes the computer to perform a union operation of the data received in association with the at least one distributed query response with the local query response.

9. The computer program product of claim 1, where the logical query indicator further encapsulates executable code to be executed by the distributed database management system, and where the computer readable program code when executed on the computer further causes the computer to execute the executable code.

\* \* \* \* \*